(No Model.) 3 Sheets—Sheet 1.
J. S. ADAMS.
CLUTCH.
No. 477,163. Patented June 14, 1892.
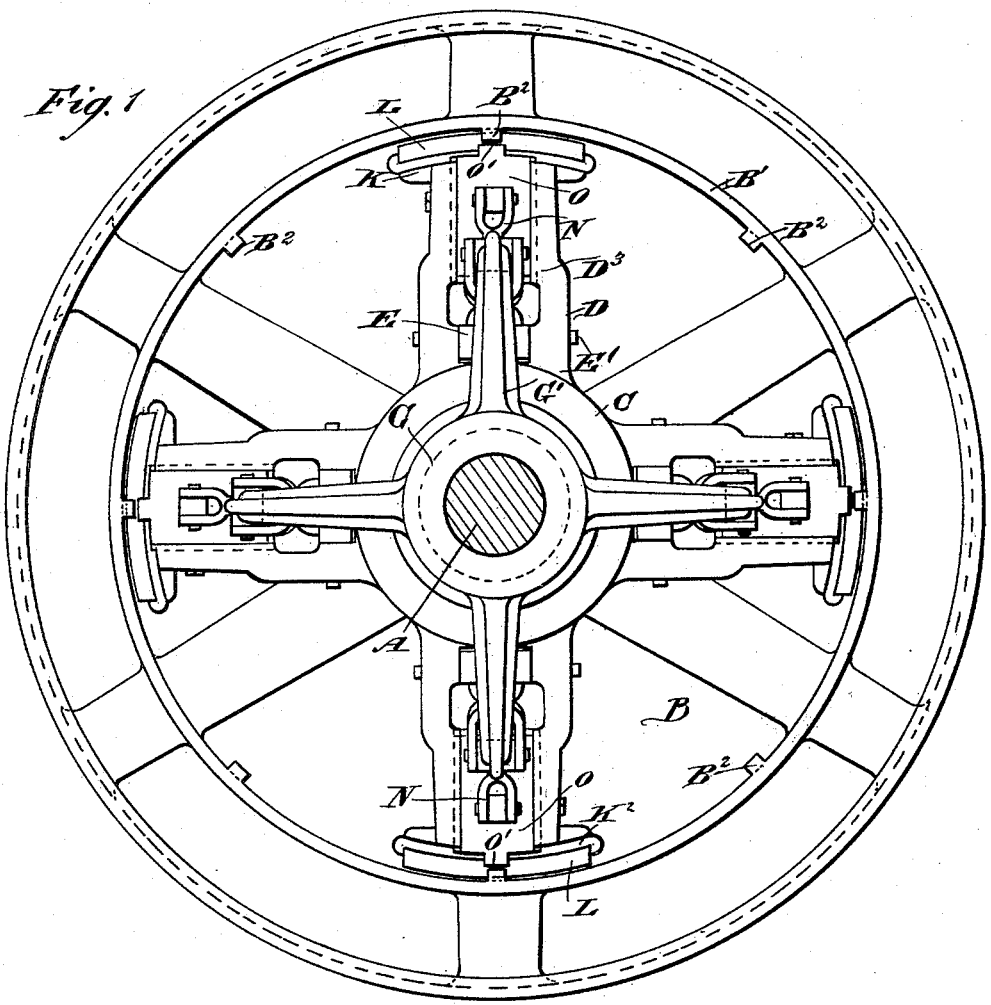
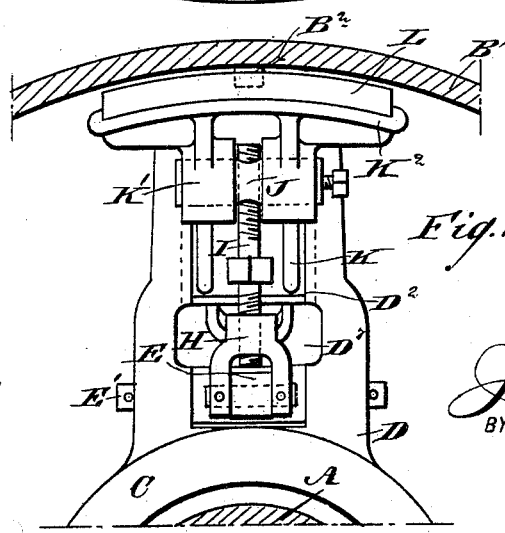
WITNESSES:
Donn Twitchell
C. Sedgwick
INVENTOR:
J. S. Adams
BY Munn & Co
ATTORNEYS

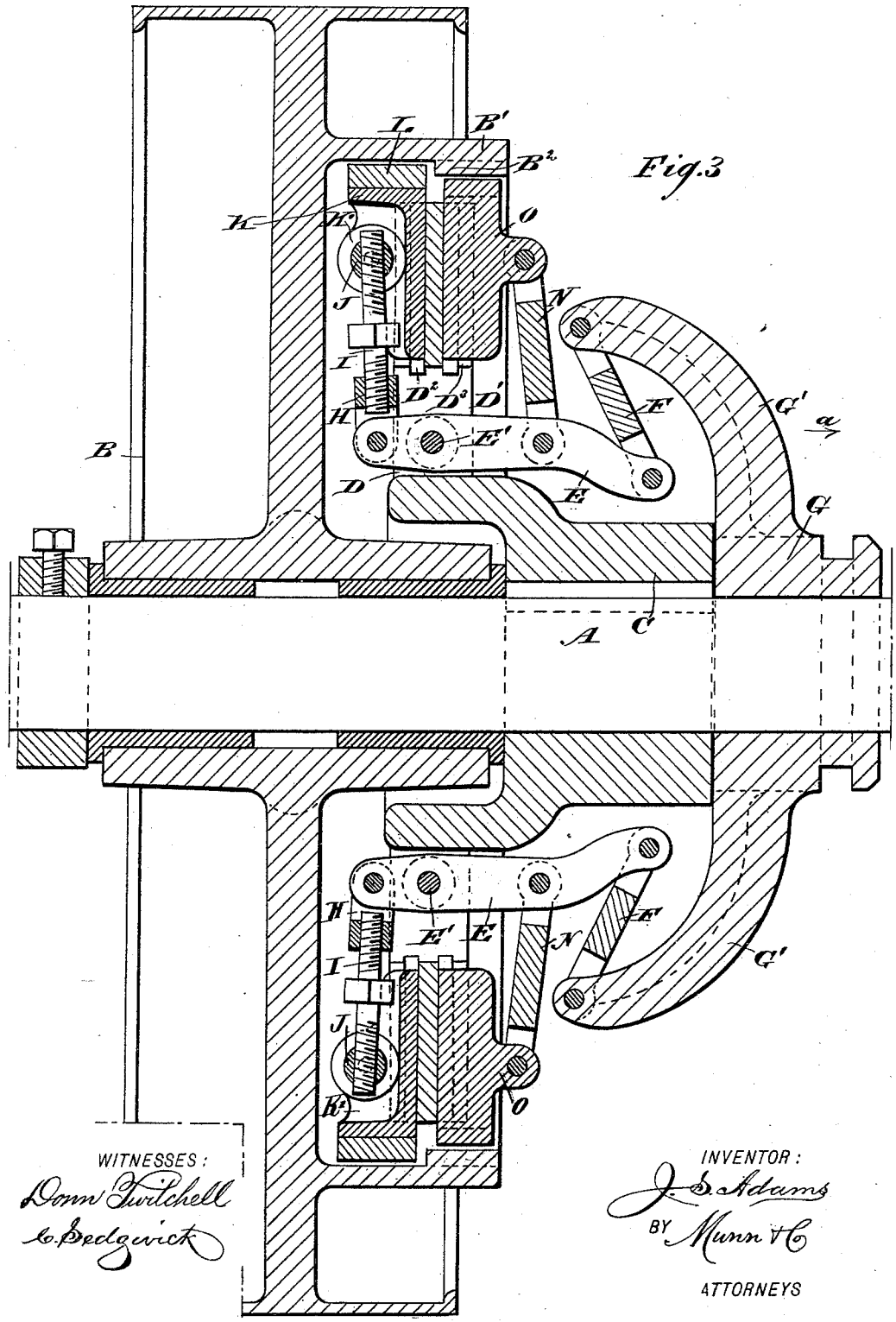

(No Model.)  3 Sheets—Sheet 3.
J. S. ADAMS.
CLUTCH.
No. 477,163.  Patented June 14, 1892.
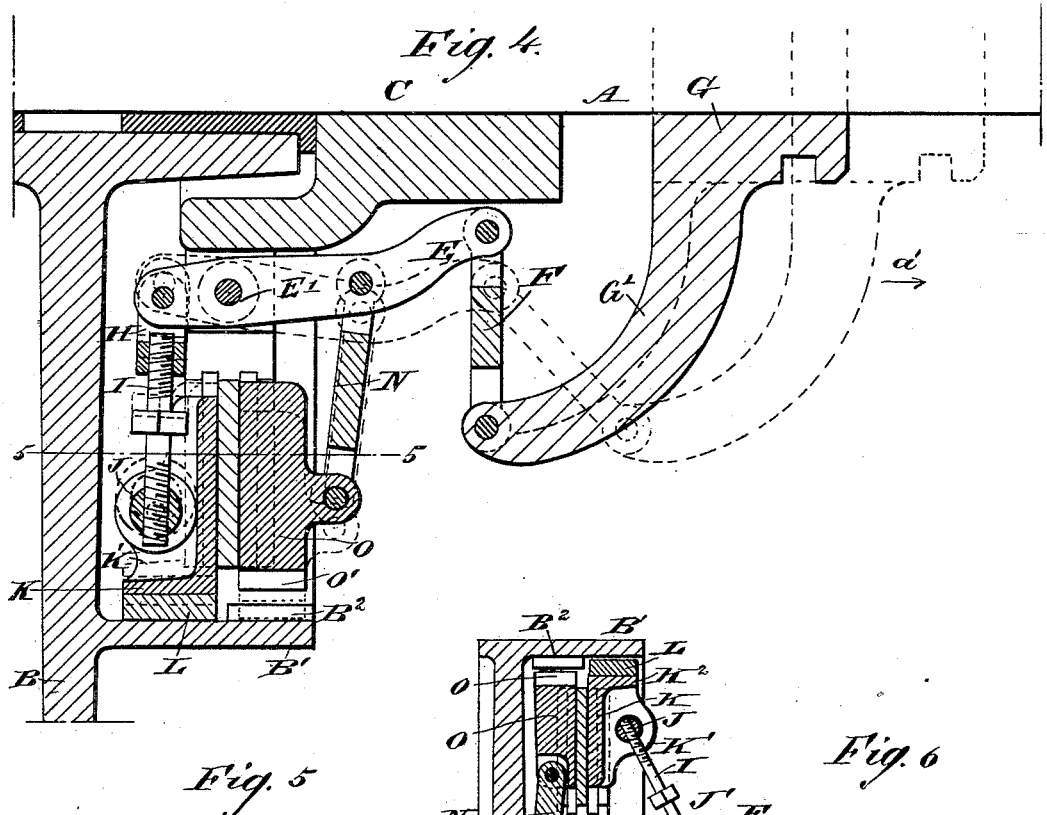
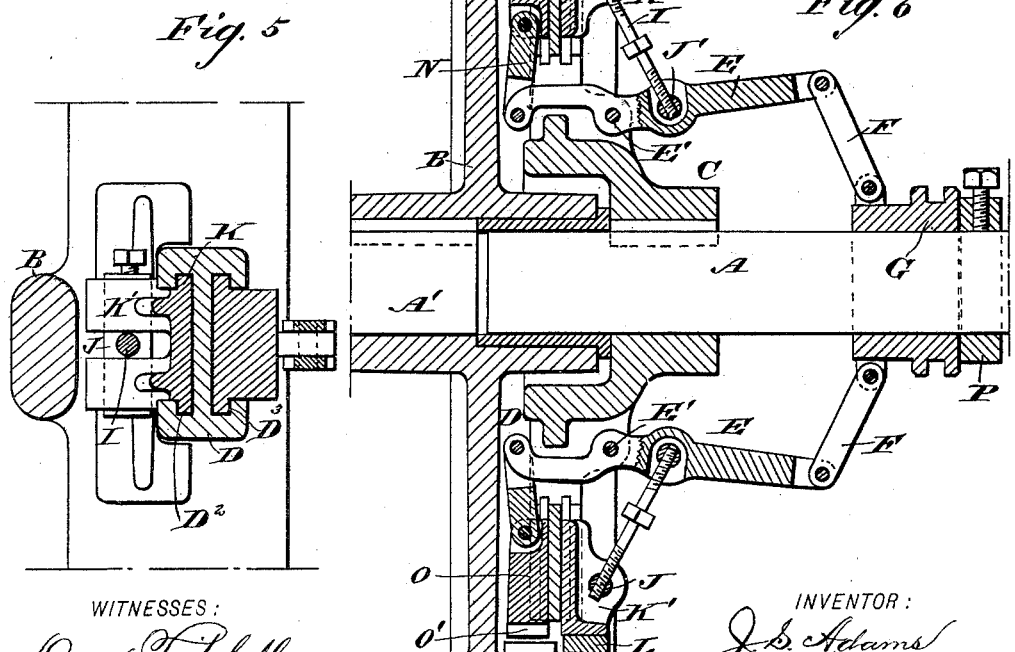
WITNESSES:
Donn Twitchell
C. Sedgwick
INVENTOR:
J. S. Adams
BY Munn & Co.
ATTORNEYS

UNITED STATES PATENT OFFICE.

JOHN S. ADAMS, OF NEW ORLEANS, LOUISIANA.

CLUTCH.

SPECIFICATION forming part of Letters Patent No. 477,163, dated June 14, 1892.

Application filed December 9, 1891. Serial No. 414,456. (No model.)

*To all whom it may concern:*

Be it known that I, JOHN S. ADAMS, of New Orleans, in the parish of Orleans and State of Louisiana, have invented a new and Improved Clutch, of which the following is a full, clear, and exact description.

The invention relates to combined friction and positive clutch pulleys and clutch-couplings.

The object of the invention is to provide a new and improved clutch which is simple and durable in construction and arranged in such a manner as to permit of gradually applying the friction-lock, and when the speed of the driving and driven parts is nearly equal the friction-lock is broken and the positive lock is actuated to connect the two parts, so as to make a direct or positive coupling.

The invention consists of two sliding blocks connected with a lever under the control of the operator.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the views.

Figure 1 is a face view of the improvement. Fig. 2 is an enlarged rear face view of part of the same. Fig. 3 is an enlarged sectional side elevation of the improvement. Fig. 4 is a like view of part of the same in a different position. Fig. 5 is a sectional plan view of the same on the line 5 5 of Fig. 4, and Fig. 6 is a sectional side elevation of a modified form of the improvement as arranged for a clutch-coupling.

On the driving-shaft A is mounted to turn loosely the pulley B to be driven, the said pulley being provided with a friction-rim B', formed at the inside, and either at its inner or outer edge with teeth or projections $B^2$. On the driving-shaft A is keyed or otherwise secured a hub C, provided with one or a series of radial arms D, each having an aperture D', through which extends a lever E, pivoted in the arm at E' and connected at its outer end by a link F with an arm G' of the sleeve G, mounted to slide loosely on the shaft and connected with the usual shifting-rod for moving the said sleeve to connect or disconnect the driving and driven parts. The inner end of the lever E carries a link H, engaged by one end of a screw-rod I, having a right and left hand thread, of which one engages the said link and the other engages a short shaft J, mounted to turn in bearings formed in the lugs K', projecting from the rear end of a sliding block K, fitted to slide radially in suitable bearings $D^2$, formed in the respective arm D. On the outer end of the sliding block K is formed a head $K^2$, supporting a brake-shoe L, adapted to engage that part of the inner surface of the rim B' having no clutch-teeth $B^2$. The front end of the lever E is also pivotally connected by a link N with a second sliding block O, mounted to slide radially in suitable bearings $D^3$, formed on the respective arm D, on the front face of the same, directly opposite the other sliding block K. The outer end of the sliding block O is provided with a rib or lug O', adapted to move close to the inner surface of the rim B' between two succeeding teeth $B^2$, so as to engage one of the same, according to the direction in which the shaft is revolved. It will be seen that when the lever E is actuated one of the blocks K or O will move outward while the other moves inward, and vice versa. By turning the screw-rod the block K can be readily adjusted, so as to bring the brake-shoe L in the proper position with relation to the inner surface of the rim B' for engagement with the same. When the sleeve G abuts against the hub C, as illustrated in Fig. 3, the two sliding blocks K and O are in such a position that the shoes L of the sliding blocks K are disengaged from the rim B' and the lugs O' of the blocks O are out of engagement and below the inner surface of the teeth $B^2$. Now when it is desired to connect the driving part with the driven part the operator moves the shifting-lever, so as to cause the sleeve G to slide in the direction of the arrow *a'* into the position shown in Fig. 4, whereby the link F is drawn into a vertical position and the rear end of the lever E is caused to move outward, thus moving the sliding block K in a like direction to engage the brake-shoe L with the inner surface of the rim B', thus connecting the pulley B with the shaft A. The other sliding block O is moved inward and is entirely out of engagement with the teeth B². As soon as the pulley B attains about the same speed as the driving-shaft A, then the operator shifts the sleeve G still farther to the right in the direction of the arrow a' until the said sleeve reaches the position shown in dotted lines in Fig. 4. By this farther movement of the sleeve G the link F pulls on the levers E, so that the front ends of the levers swing outward and the rear ends swing inward, thus simultaneously shifting the blocks K and O in opposite directions, whereby the shoe L of the block K is moved out of frictional contact with the rim B' and the other block O is moved outward to pass with its lugs O' between two succeeding teeth B² on the rim B'. The said lugs O' of the several blocks each engage either of the teeth B², according to the direction in which the shaft is revolved, thus making a positive connection between the pulley B and the shaft A.

When the operator desires to disengage the driving from the driven parts, he shifts the sleeve G in the inverse direction of the arrow a', so as to move the block O out of contact with the teeth B² and the brake-shoe L in contact with the rim B' to finally move the said brake-shoes out of frictional contact with the rim at the time the inner face of the sleeve G abuts against the hub C. (See Fig. 3.)

If it is desired to couple two shafts A and A', a similar arrangement is made, the pulley B then being keyed on the shaft A'. As shown in Fig. 6, the position of the blocks K and O is reversed—that is, the block O is arranged on the inside of the arm D, while the block K, carrying the brake-shoe L, is on the outside of the same. The link H is dispensed with and the screw-rod I engages a second short shaft J', held in the lever E. The sleeve G is held in an outermost position against a stop-collar P, secured on the shaft A. When in this position, the two sliding blocks K and O are disengaged from the rim B' and teeth B², and when the sleeve is moved into an intermediate position between the collar P and the hub C then the friction-clutch is applied, and on a farther inward movement the friction-clutch is disconnected and the positive clutch engages the pulley in the manner above described. The sleeve G then rests on the hub C. Thus it will be seen that when the sleeve is shifted into an intermediate position a friction-lock is established between the driving and driven parts, so as to gradually impart the speed of the driving part to the part to be driven. When the speeds of the driving and driven parts are equal, or nearly so, the positive clutch is brought into play to positively connect the driving parts with the driven.

Having thus described my invention, I claim as new and desire to secure by Letters Patent—

1. In a clutch, the combination, with two sliding blocks and a sliding sleeve, of a lever mechanism connected to said blocks and sleeve for alternately operating the blocks by a continuous movement of the said sleeve, substantially as described.

2. In a clutch, the combination, with two sliding blocks and a sliding sleeve, of a lever pivoted a short distance from one end, connected on opposite sides of its pivot with the sliding blocks, and having one end pivotally connected to the sleeve and alternately operating the blocks by a continuous movement of the said sleeve, substantially as described.

3. In a clutch, the combination, with two sliding blocks and a sliding sleeve, of a lever pivoted a short distance from one end, links connected to the lever on opposite sides of its pivot and to the blocks, and a link pivoted to one end of the lever and to the sleeve, whereby the blocks will be alternately operated by a continuous movement of the sleeve, substantially as described.

4. In a clutch, the combination, with a pulley having teeth on one portion of its rim and a sliding sleeve, of two sliding brake-blocks, one of which is provided with teeth, a pivoted lever having its longer arm pivotally connected to the sleeve, and links connecting the lever with the blocks, substantially as described.

5. In a clutch, the combination, with a hub and a sliding sleeve, of sliding blocks carried by the said hub, a pivoted lever, links connecting the lever with the blocks, one of the said links being adjustable, and a link pivoted to the lever and to the sleeve, substantially as described.

6. In a device of the class described, the combination, with a pulley having teeth on one portion of its rim and a hub provided with arms having guideways, of a lever pivoted on each of the said arms, blocks fitted to slide in the said guideways, one of the blocks being provided with teeth, links connecting the said blocks with the said lever at opposite sides of its fulcrum, and a brake-shoe held on one of the said blocks and adapted to engage the rim of the pulley to be driven, substantially as shown and described.

7. In a device of the class described, the combination, with a hub provided with arms having guideways, of a lever pivoted on each of the said arms, blocks fitted to slide in the said guideways, links connecting the said blocks with the said lever at opposite sides of its fulcrum, a brake-shoe held on one of the said blocks and adapted to engage the rim of the pulley to be driven, the other block being provided with a tooth for engaging a tooth on the rim of the said pulley, substantially as shown and described.

8. In a device of the class described, the combination, with a hub provided with arms having guideways, of a lever pivoted on each of the said arms, blocks fitted to slide in the said guideways, links connecting the said blocks with the said lever at opposite sides of its fulcrum, a brake-shoe held on one of the said blocks and adapted to engage the rim of the pulley to be driven, the other block being
5 provided with a tooth for engaging a tooth on the rim of the said pulley, a sleeve mounted to slide and provided with arms, and links connecting the said arms with the said levers, substantially as shown and described.

JOHN S. ADAMS.

Witnesses:
JOHN W. ADAMS,
ALBERT B. ADAMS.